US012577984B2

(12) United States Patent
Ariapad et al.

(10) Patent No.: US 12,577,984 B2
(45) Date of Patent: Mar. 17, 2026

(54) BEARING SUPPORT FOR A FLUID BEARING OF A CLOSED-CYCLE ENGINE

(71) Applicant: Hyliion Holdings Corp, Cedar Park, TX (US)

(72) Inventors: Alex William Ariapad, Cincinnati, OH (US); Joshua Tyler Mook, Loveland, OH (US); Aigbedion Akwara, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 132 days.

(21) Appl. No.: 18/604,607

(22) Filed: Mar. 14, 2024

(65) Prior Publication Data

US 2025/0290544 A1      Sep. 18, 2025

(51) Int. Cl.
*F16C 29/02* (2006.01)
*F16C 29/00* (2006.01)
*F16C 35/02* (2006.01)
*F16C 35/10* (2006.01)

(52) U.S. Cl.
CPC ............ *F16C 29/002* (2013.01); *F16C 29/02* (2013.01); *F16C 35/02* (2013.01); *F16C 35/10* (2013.01); *F16C 2380/26* (2013.01)

(58) Field of Classification Search
CPC .......... F16C 23/02; F16C 23/04; F16C 25/02; F16C 29/001; F16C 29/002
See application file for complete search history.

(56) References Cited

U.S. PATENT DOCUMENTS

| | | | | |
|---|---|---|---|---|
| 2,103,465 | A | * | 12/1937 | Kinzie .................... F16C 23/04 |
| | | | | 384/210 |
| 3,542,441 | A | * | 11/1970 | Nixon ..................... F16C 33/04 |
| | | | | 384/312 |
| 4,995,734 | A | * | 2/1991 | Schroeder ............... F16C 29/12 |
| | | | | 384/57 |
| 10,724,470 | B1 | * | 7/2020 | Mook ................... F02G 1/0435 |
| 2023/0234176 | A1 | | 7/2023 | Kawase et al. |

FOREIGN PATENT DOCUMENTS

| | | |
|---|---|---|
| JP | S55107161 A | 8/1980 |
| JP | S57136756 U | 8/1982 |
| WO | WO2008065958 A1 | 6/2008 |

OTHER PUBLICATIONS

European Search Report Corresponding to U.S. Appl. No. 25/153,581 on Jun. 24, 2025.

* cited by examiner

*Primary Examiner* — James Pilkington
(74) *Attorney, Agent, or Firm* — Dority & Manning, P.A.

(57) ABSTRACT

A linear electric machine includes a shaft, a piston assembly operably coupled with the shaft, a stator assembly supporting the shaft and housing a load device, and a bearing assembly supporting an end of the shaft. The bearing assembly includes a bearing housing, a fluid bearing within the bearing housing, and a bearing support defining a support surface engaged with the fluid bearing. The bearing housing includes an opening for receiving the shaft therethrough. Further, the support surface of the bearing support defines an arcuate profile to allow the fluid bearing to maintain alignment with the shaft as the shaft tilts during operation of the linear electric machine.

17 Claims, 9 Drawing Sheets

BEARING SUPPORT FOR A FLUID BEARING OF A CLOSED-CYCLE ENGINE

FIELD

The present disclosure relates generally to vehicles having a closed-cycle engine, and more particularly to a bearing support for a fluid bearing of a closed-cycle engine.

BACKGROUND

Large vehicles may be used to efficiently transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

Such vehicles may be designed with unique configurations capable of integrating one of several different types of engines, such as a closed-cycle engine, to generate electric power for charging an array of batteries under a plurality of operating conditions.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
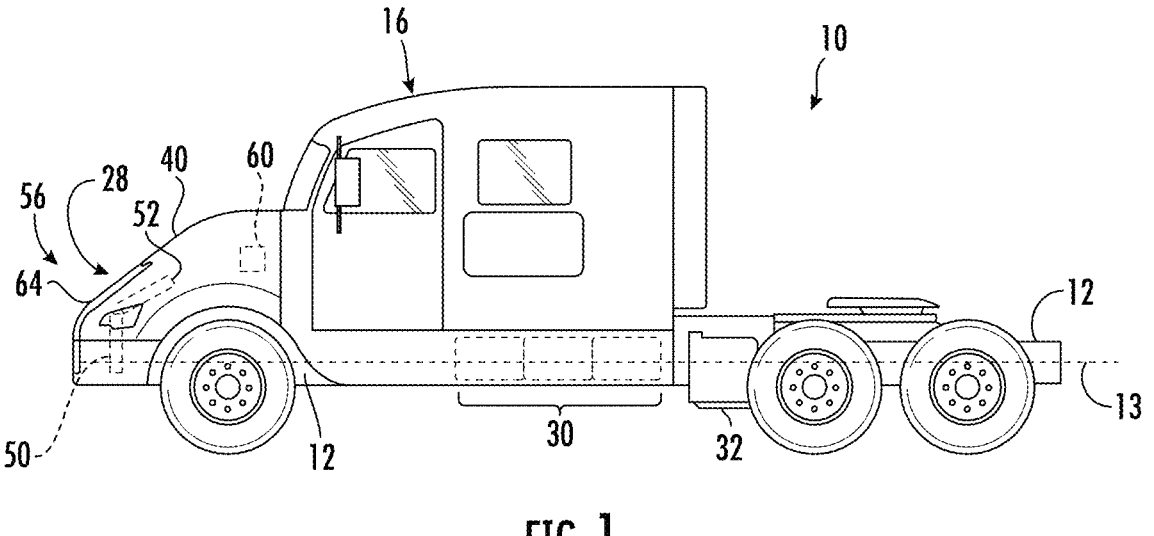
FIG. 1 illustrates a side view of an embodiment of a wheeled vehicle capable of transporting cargo over an extended range according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
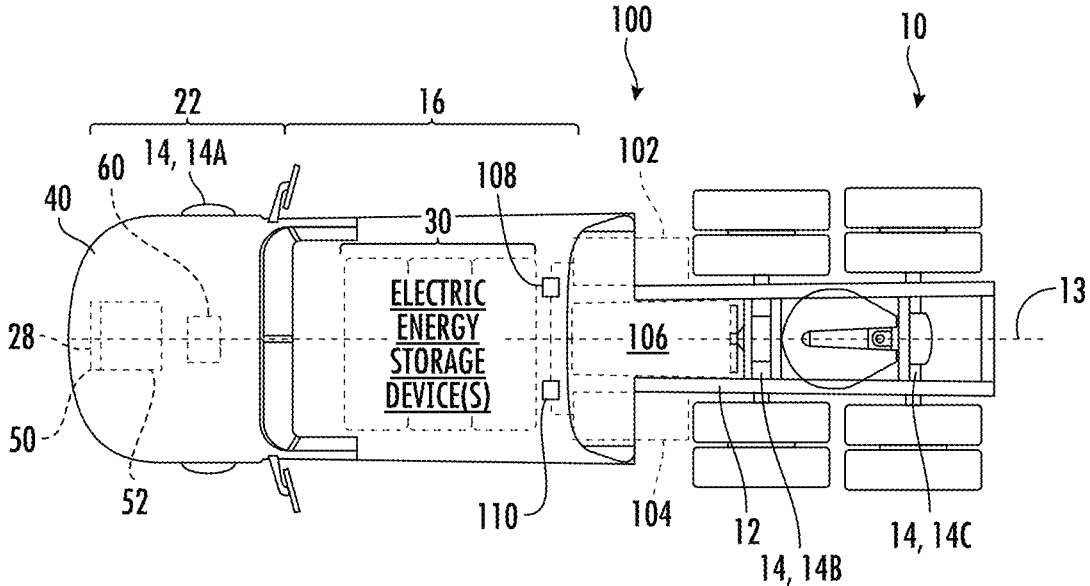
FIG. 2 illustrates a detailed, top view of an embodiment of a wheeled vehicle capable of transporting cargo over an extended range according to the present disclosure.
Figure 3:
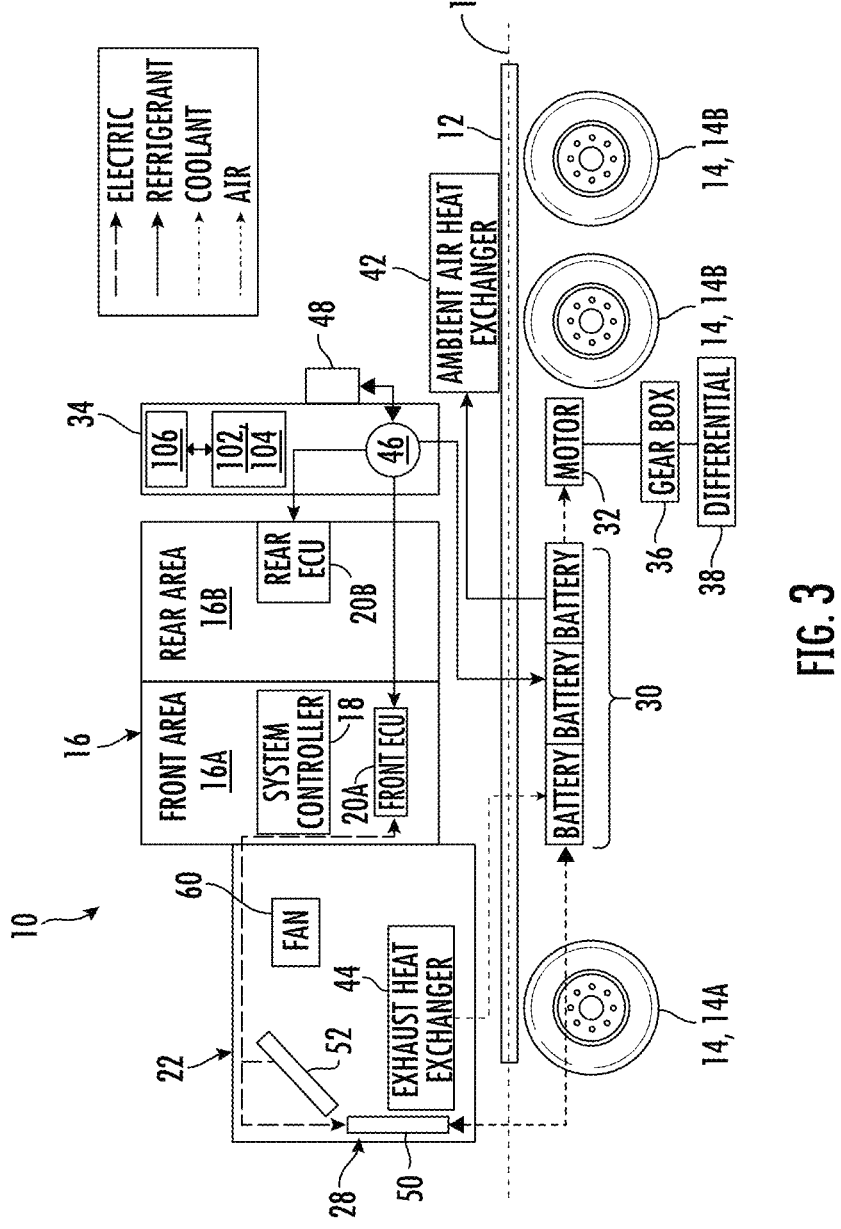
FIG. 3 illustrates a schematic diagram of an embodiment of the vehicle depicted in FIGS. 1 and 2.

Referring now to the drawings, FIGS. 1-3 illustrate various views of an embodiment of a wheeled vehicle 10 along a longitudinal axis 13 according to the present disclosure. In particular, FIGS. 1 and 2 depict side and top partial views of the wheeled vehicle 10, respectively, such as a truck or semi-tractor used to pull one or more trailers with cargo. As shown generally in FIGS. 1-3, components of the vehicle 10 may include, but are not limited to, a chassis 12, which may support multiple axles 14, a cab 16, a compartment 22 containing a radiator assembly 28, an engine assembly 100 having one or more closed-cycle engines 102, 104 mounted to the chassis 12 aft of the radiator assembly 28, e.g., outside of the compartment 22, a hood 40 for accessing the compartment 22, an array of energy storage devices 30 (e.g., batteries), and a motor/generator 32 coupled to at least one of the axles 14. Moreover, as shown particularly in FIG. 2, the one or more closed-cycle engines 102, 104 may be fluidly coupled with one or more fuel tanks 106. Furthermore, as shown in FIG. 2, the vehicle 10 may be equipped with one or more power converters 108, 109 coupled to the closed-cycle engines 102, 104 and the array of energy storage devices 30.

In an embodiment, the chassis 12 may be formed with two frame members such as C-channels arranged parallel to each other. Further, in an embodiment, as shown in FIGS. 2 and 3, the axles 14 coupled to the chassis 12 may include a front axle 14A located under the compartment 22 and rear axles 14B and 14C located behind the cab 16.

Moreover, in an embodiment, the compartment 22 includes mounts for supporting the radiator assembly 28. Thus, the radiator assembly 28 may be positioned at the front of the compartment 22 for cooling the closed closed-cycle engines 102, 104. As such, in an embodiment, coolant, such as glycol or some other anti-freeze liquid, may be circulated through the radiator assembly 28 and the closed closed-cycle engines 102, 104 to remove heat from the closed closed-cycle engines 102, 104 and transfer the heat to the ambient air as further described herein.

Referring particularly to FIG. 3, the cab 16 may further include a system controller 18 for monitoring systems on the vehicle 10 and one or more environmental control units (ECU) 20 having air conditioning and heating options. As depicted in FIG. 3, a front area 16A of the cab 16 may have a front ECU 20A for managing cab temperatures and a rear area 16B of the cab 16 may have a rear ECU 20B for managing rear area temperatures. In such embodiments, the front and rear ECUs 20A, 20B may be fluidly coupled to a compressor 46 and a refrigerant heat exchanger 48 as part of an air conditioning system for the cab 16 and a thermal management system for the energy storage devices 30.

In an embodiment, as shown in FIG. 3, the vehicle 10 may further include an ambient air heat exchanger 42 for heat exchange between the energy storage devices 30 and the ambient air and an exhaust heat exchanger 44 for extracting heat from exhaust gases to heat the energy storage devices 30.

Further, as shown in FIGS. 1-3, an array of energy storage devices 30 may be positioned in various locations on the vehicle 10. In some embodiments, as shown, the energy storage devices 30 may be located on the chassis 12. In some embodiments, the energy storage devices 30 may be located between, under, or around the rails of the chassis 12.

Moreover, in an embodiment, the array of energy storage devices 30 may be connected in series, parallel or some combination. Thus, in an embodiment, electric power generated by the generator 26 may be used to charge the array of energy storage devices 30.

Referring to FIGS. 2 and 3, the motor/generator 32 may be coupled to at least one of the axles 14. For example, in some embodiments, the motor/generator 32 may be integrated with one of the axles 14 as an e-axle configuration or located in a hub of a wheel coupled to one of the axles 14 as a hub motor/generator configuration. Moreover, embodiments of the vehicle 10 may include the motor/generator 32 coupled to gearboxes or differentials. For example, as depicted in FIG. 3, the motor/generator 32 may be coupled to a three-speed centralized gearbox 36 with a two-speed rear differential 38 to provide six discrete gear ratios. In some embodiments, the vehicle 10 may be configured with a plurality of motor/generators 32, with a motor/generator 32 coupled to each wheel or pair of wheels. Moreover, as shown in FIGS. 2 and 3, behind the cab 16, the rear pack 34 may be configured to hold one or more fuel tanks 106 for use by closed closed-cycle engines 102, 104.

The vehicle 10 may also include a fan 60 positioned aft of the first and second radiators 50, 52 and forward of the closed-cycle engines 102, 104 so as to draw air into the first and second radiators 50, 52 and down to the ground 74. For example, in an embodiment, the fan 60 is configured to draw the incoming airflow 56 through the grille 64, across the first radiator 50, across the second radiator 52, and then out of the vehicle 10 directly to the ground 74.

Figure 4:
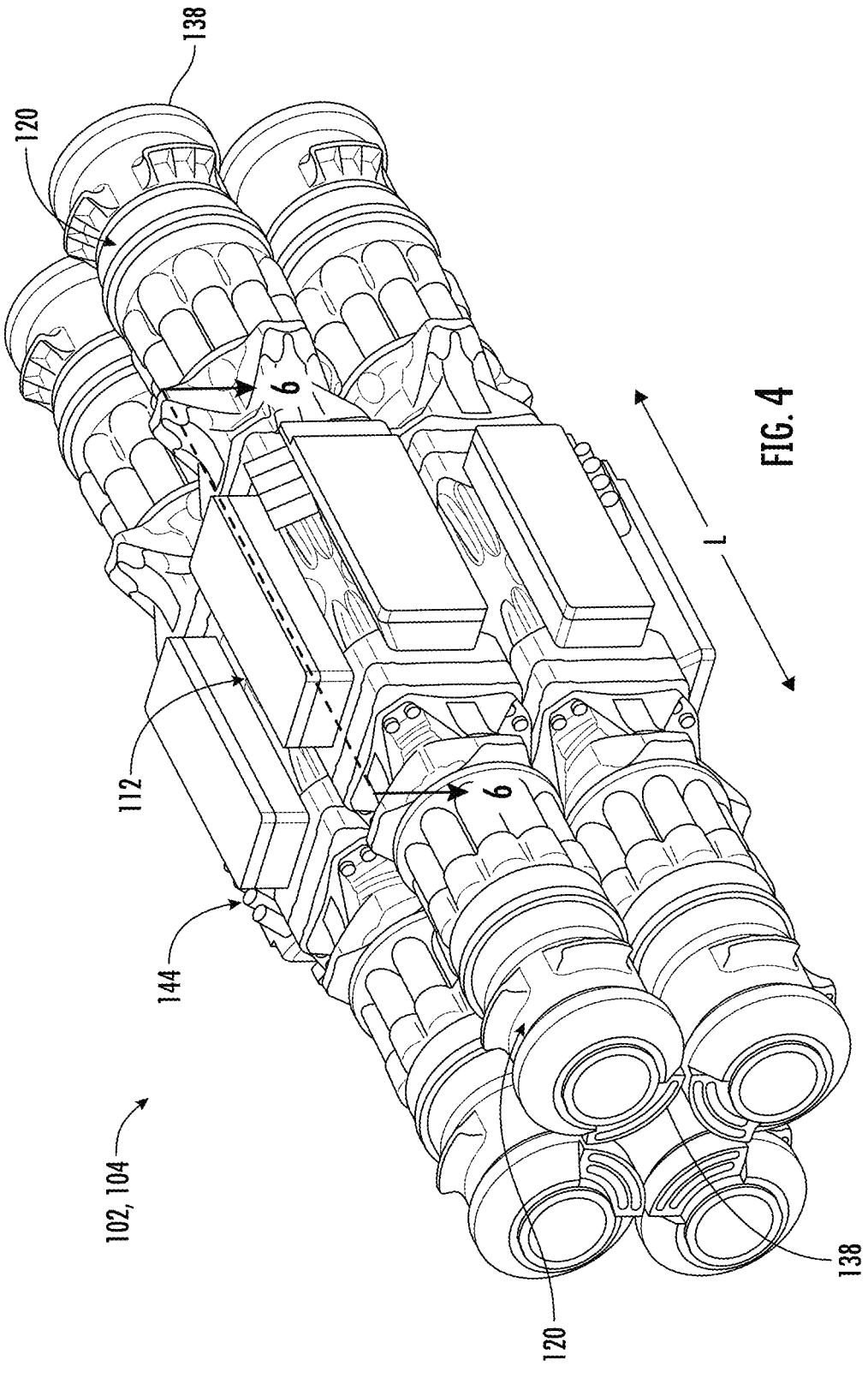
FIG. 4 illustrates a perspective view of an embodiment of a closed-cycle engine for a vehicle according to the present disclosure.
Figure 5:
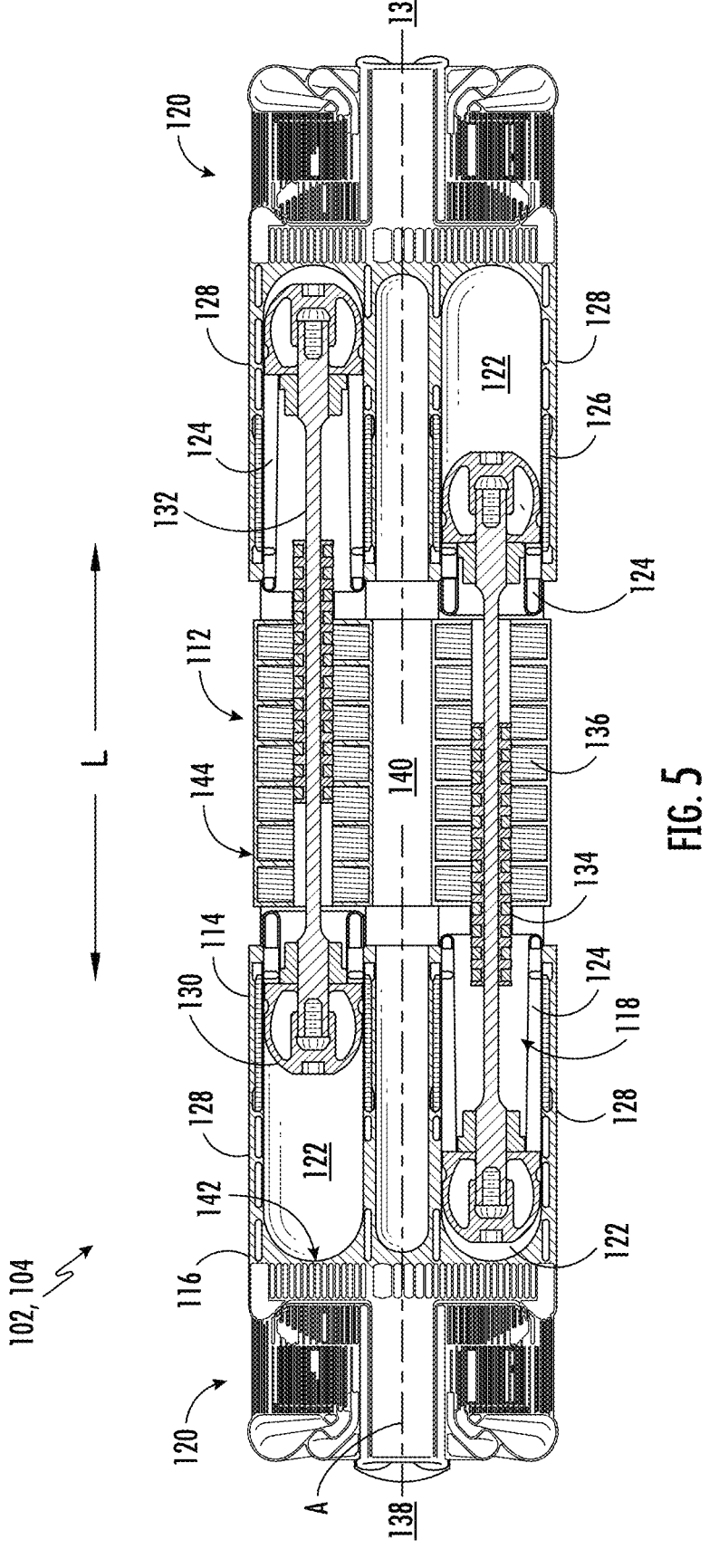
FIG. 5 illustrates a cross-sectional view of an embodiment of one of the closed-cycle engines according to the present disclosure.

Referring now to FIGS. 4 and 5, various views of an embodiment of one of the closed-cycle engines 102, 104 along longitudinal axis A and operably coupled to a load device 112 are illustrated according to the present disclosure. FIG. 4 illustrates a perspective view of an embodiment of one of the closed-cycle engines 102, 104 according to the present disclosure. FIG. 5 illustrates a cross-sectional view of an embodiment of one of the closed-cycle engines 102, 104 according to the present disclosure. As shown in FIG. 5, in an embodiment, the closed-cycle engine 102, 104 contains a substantially fixed mass of an engine working fluid to which and from which thermal energy is exchanged at a respective cold side heat exchanger 114 and a hot side heat exchanger 116. In an embodiment, the engine working fluid is helium. In other embodiments, the engine working fluid may include air, nitrogen, hydrogen, helium, or any appropriate compressible fluid, or combinations thereof.

In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the closed-cycle engine 102, 104. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device 112 is a mechanical work device or an electric machine. In an embodiment, the load device 112 is a pump, compressor, or other work device. In another embodiment, the load device 112 as an electric machine is configured as a generator producing electric energy from movement of a piston assembly 118 at the closed-cycle engine 102, 104. In still another embodiment, the electric machine is configured as a motor providing motive force to move or actuate the piston assembly 118, such as to provide initial movement (e.g., a starter motor). In still various embodiments, the electric machine defines a motor and generator or other electric machine apparatus such as described further herein.

A heater body 120 is thermally coupled to the closed-cycle engine 102, 104. The heater body 120 may generally define any apparatus for producing or otherwise providing a heating working fluid such as to provide thermal energy to the engine working fluid. Various embodiments of the heater body 120 are further provided herein. Exemplary heater bodies 120 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies 120 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. In an embodiment, the heater body 120 providing thermal energy to the engine working fluid may include all or part of a combined heat and power cycle, or cogeneration system, or power generation system generally.

In still various embodiments, the heater body 120 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, as shown in FIG. 5, the hot side heat exchanger 116 outputs thermal energy to the engine working fluid at an expansion chamber 122 of the closed-cycle engine 102, 104. The hot side heat exchanger 116 is positioned at the expansion chamber 122 of the engine in thermal communication with the heater body 120. In other embodiments, the hot side heat exchanger 116 may be separate from the heater body 120, such that the heating working fluid is provided in thermal communication, or additionally, in fluid communication with the hot side heat exchanger 116. In particular embodiments, the hot side heat exchanger 116 is positioned in direct thermal communication with the heater body 120 and the expansion chamber 122 of the engine 102, 104 such as to receive thermal energy from the heater body 120 and provide thermal energy to the engine working fluid within the closed-cycle engine 102, 104.

In still various embodiments, the heater body 120 may include a single thermal energy output source to a single expansion chamber 122 of the engine. As such, the closed-cycle engine 102, 104 may include a plurality of heater assemblies each providing thermal energy to the engine working fluid at each expansion chamber 122. In other embodiments, such as depicted in regard to FIG. 4, the heater body 120 may provide thermal energy to a plurality of expansion chambers 122 of the closed-cycle engine 102, 104.

The closed-cycle engine 102, 104 further includes a chiller assembly, such as chiller assembly 126 further described herein. The chiller assembly 126 is configured to receive and displace thermal energy from a compression chamber 124 of the closed-cycle engine 102, 104. Further, in an embodiment, the cold side heat exchanger 114 is thermally coupled to the compression chamber 124 of the closed cycle engine 102, 104 and the chiller assembly 126. In one embodiment, the cold side heat exchanger 114 and a piston body 128 defining the compression chamber 124 of the closed-cycle engine 102, 104 are together defined as an integral, unitary structure. In still various embodiments, the cold side heat exchanger 114, at least a portion of the piston body 128 defining the compression chamber 124, and at least a portion of the chiller assembly 126 together define an integral, unitary structure.

In various embodiments, as shown in FIG. 5, the chiller assembly 126 is a bottoming cycle to the closed-cycle engine 102, 104. As such, the chiller assembly 126 is configured to receive thermal energy from the closed-cycle engine 102, 104. The thermal energy received at the chiller assembly 126, such as through a cold side heat exchanger 114, or a cold side heat exchanger 114 further herein, from the closed-cycle engine 102, 104 is added to a chiller working fluid at the chiller assembly 126. In various embodiments, the chiller assembly 126 defines a Rankine cycle system through which the chiller working fluid flows in closed loop arrangement with a compressor. In some embodiments, the chiller working fluid is further in closed loop arrangement with an expander. In various embodiments, the cold side heat exchanger 114 may include a condenser or radiator. The cold side heat exchanger 114 is positioned downstream of the compressor and upstream of the expander and in thermal communication with the compression chamber 124 of the closed-cycle engine 102, 104. In various embodiments, the cold side heat exchanger 114 may generally define an evaporator receiving thermal energy from the closed-cycle engine 102, 104.

Various embodiments of the closed-cycle engine 102, 104 include control systems and methods of controlling various sub-systems disclosed herein, such as, but not limited to, the fuel source, the oxidizer source, the cooling fluid source, the heater body 120, the chiller assembly 126, and the load device 112, including any flow rates, pressures, temperatures, loads, discharges, frequencies, amplitudes, or other suitable control properties associated with the closed-cycle engine 102, 104.

In an embodiment, the control system can control the closed-cycle engine 102, 104 and its associated balance of plant to generate a temperature differential, such as a temperature differential at the engine working fluid relative to the heating working fluid and the chiller working fluid. Thus, the closed-cycle engine 102, 104 defines a hot side, such as at the expansion chamber 122, and a cold side, such as at the compression chamber 124. The temperature differential causes free piston assemblies 118 to move within their respective piston chambers defined at respective piston bodies 128. The movement of pistons 130 within the respective piston bodies 128 causes the electric machine to generate electrical power. The generated electrical power can be provided to the energy storage devices 30 for charging thereof. The control system monitors one or more operating parameters associated with the closed-cycle engine 102, 104, such as piston movement (e.g., amplitude and position), as well as one or more operating parameters associated with the electric machine, such as voltage or electric current. Based on such parameters, the control system generates control commands that are provided to one or more controllable devices of the closed-cycle engine 102, 104. The controllable devices execute control actions in accordance with the control commands. Accordingly, the desired output of the closed-cycle engine 102, 104 can be achieved.

Referring still to FIG. 5, each piston assembly 118 is positioned within a volume or piston chamber defined by a wall defining the piston body 128. The volume within the piston body 128 is separated into a first chamber, or hot chamber, or expansion chamber 122 and a second chamber, or cold chamber (relative to the hot chamber), or compression chamber 124 by a piston 130 of the piston assembly 118. The expansion chamber 122 is positioned thermally proximal to the heater body 120 relative to the compression chamber 124 thermally distal to the heater body 120. The compression chamber 124 is positioned thermally proximal to the chiller assembly 126 relative to the expansion chamber 122 thermally distal to the chiller assembly 126.

In various embodiments, the piston assembly 118 defines a double-ended piston assembly 118 in which a pair of pistons 130 is each coupled to a connection member 132. The connection member 132 may generally define a rigid shaft or rod extended along a direction of motion of the piston assembly 118. In other embodiments, the connection members 132 includes one or more springs or spring assemblies, such as further provided herein, providing flexible or non-rigid movement of the connection member 132. In still other embodiments, the connection member 132 may further define substantially U- or V-connections between the pair of pistons 130.

Each piston 130 is positioned within the piston body 128 such as to define the expansion chamber 122 and the compression chamber 124 within the volume of the piston body 128. The load device 112 is operably coupled to the piston assembly 118 such as to extract energy therefrom, provide energy thereto, or both. The load device 112 defining an electric machine is in magnetic communication with the closed closed-cycle engine 102, 104 via the connection member 132. In various embodiments, the piston assembly 118 includes a dynamic member 134 positioned in operable communication with a stator assembly 136 of the electric machine. The stator assembly 136 may generally include a magnet array 205 and a plurality of windings 207 wrapped circumferentially relative to the piston assembly 118 and extended along a lateral direction L. In an embodiment, such as depicted in regard to FIG. 4, the dynamic member 134 is connected to the connection member 132. The electric machine may further be positioned between the pair of pistons 130 of each piston assembly 118. Dynamic motion of the piston assembly 118 generates electricity at the electric machine. For example, linear motion of the dynamic member 134 between each pair of chambers defined by each piston 130 of the piston assembly 118 generates electricity via the magnetic communication with the stator assembly 136 surrounding the dynamic member 134.

Referring still to FIG. 5, in various embodiments, the hot side heat exchanger 116 may further define at least a portion of the expansion chamber 122. In an embodiment, such as further described herein, the hot side heat exchanger 116 defines a unitary or monolithic structure with at least a portion of the piston body 128, such as to define at least a portion of the expansion chamber 122. In some embodiments, the heater body 120 further defines at least a portion of the hot side heat exchanger 116, such as to define a unitary or monolithic structure with the hot side heat exchanger 116, such as further described herein.

Furthermore, as shown in FIGS. 4 and 5, the closed-cycle engine 102, 104 defines an outer end 138 and an inner end 140 (FIG. 5) each relative to a lateral direction L. The outer ends 138 define laterally distal ends of the closed-cycle engine 102, 104 and the inner ends 140 define laterally inward or central positions of the closed-cycle engine 102, 104. In one embodiment, such as depicted in regard to FIG. 5, the heater body 120 is positioned at outer ends 138 of the closed-cycle engine 102, 104. The piston body 128 includes a dome structure 142 at the expansion chamber 122. The expansion chamber dome structure 142 provides reduced surface area heat losses across the outer end 138 of the expansion chamber 122. In various embodiments, the pistons 130 of the piston assembly 118 further include domed pistons 130 corresponding to the expansion chamber 122 dome. The dome structure 142, the domed piston 130, or both may provide higher compressions ratios at the chambers 122, 124, such as to improve power density and output.

In various embodiments, such as depicted in regard to FIG. 5, the load device 112 is positioned at the inner end 140 of the closed-cycle engine 102, 104 between laterally opposing pistons 130. The load device 112 may further include a machine body 144 positioned laterally between the piston bodies 128. The machine body 144 surrounds and houses the stator assembly 136 of the load device 112 defining the electric machine. The machine body 144 further surrounds the dynamic member 134 of the electric machine attached to the connection member 132 of the piston assembly 118.

Figure 6:
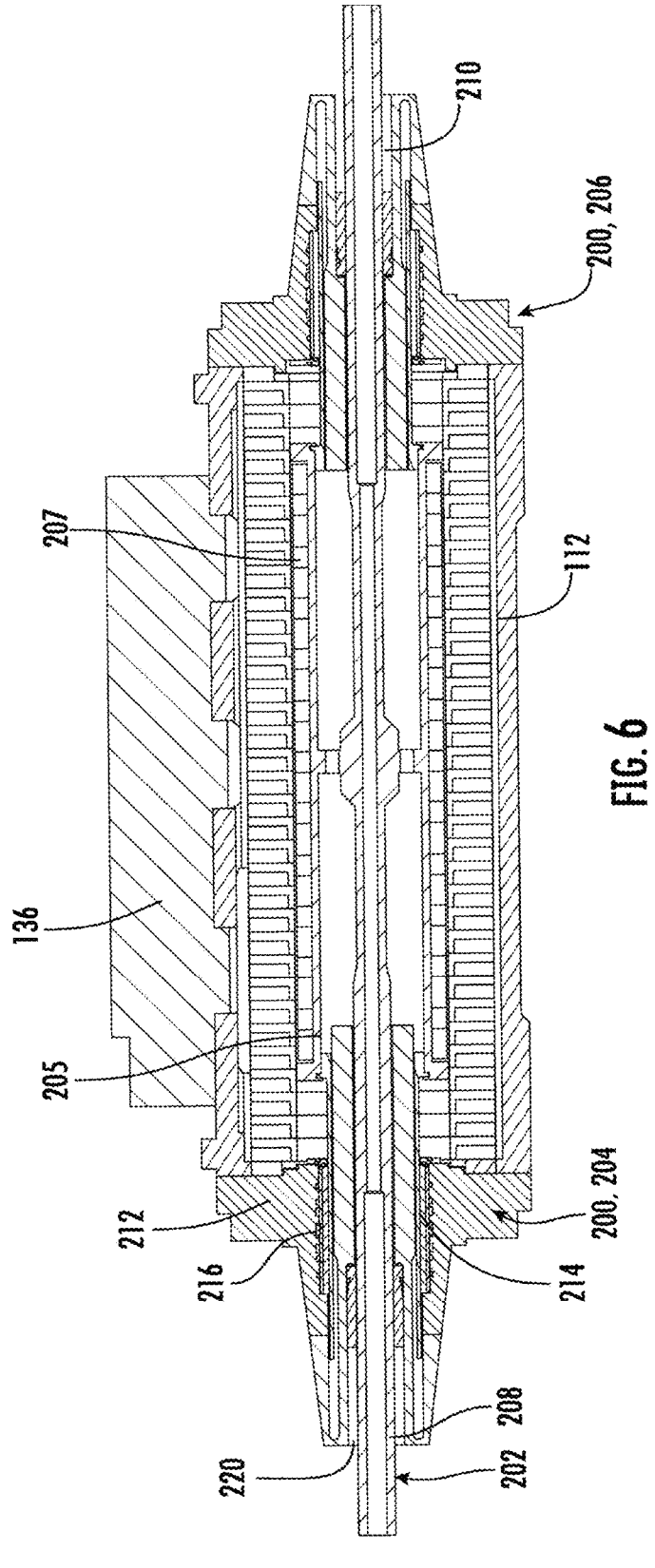
FIG. 6 illustrates a cross-sectional view of a portion of the closed-cycle engine illustrated in FIG. 4 along section line 6-6 according to the present disclosure.
Figure 7:
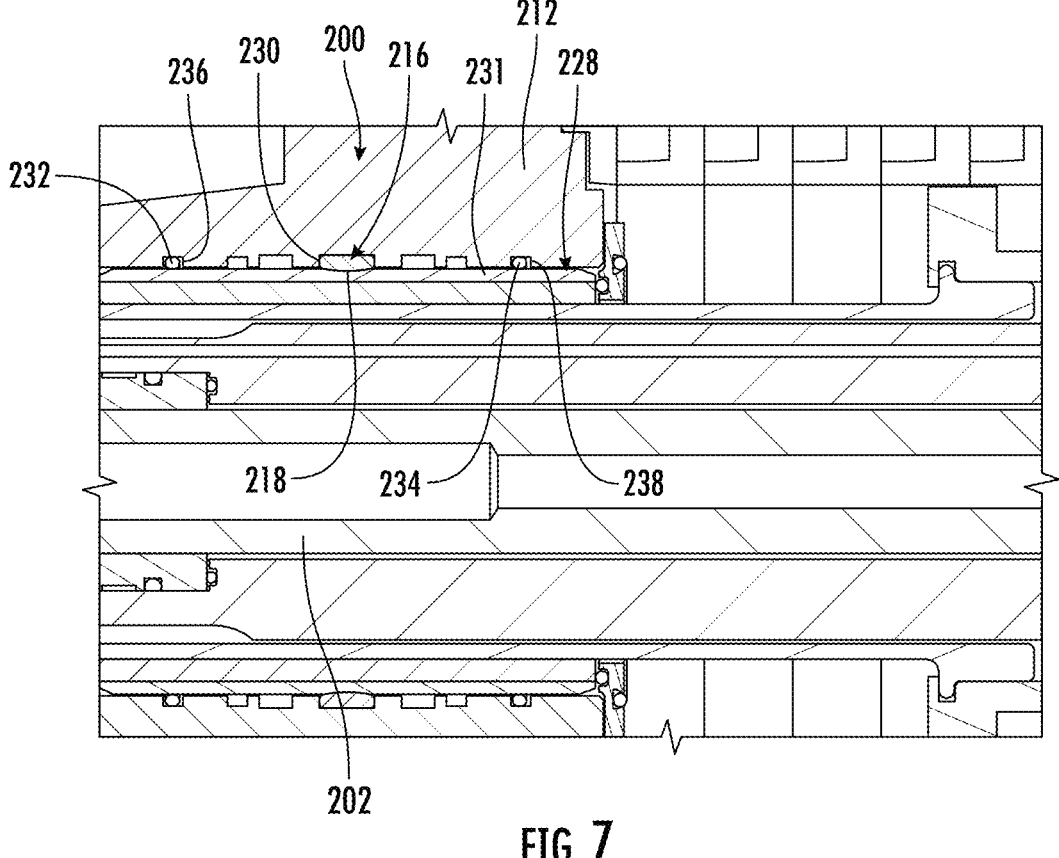
FIG. 7 illustrates a detailed view of a portion of the cross-sectional view of FIG. 6.
Figure 8:
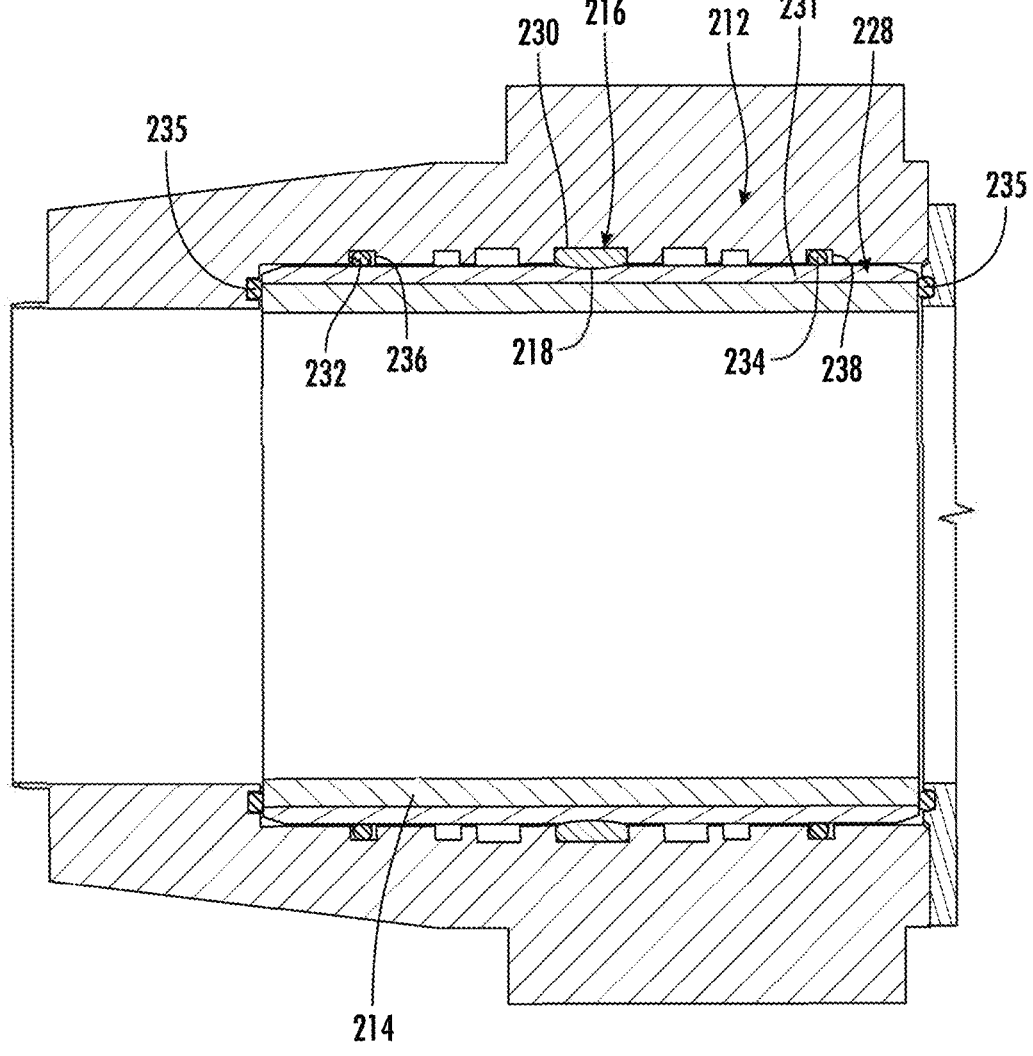
FIG. 8 illustrates a detailed view of a portion of the cross-sectional view of FIG. 7.
Figure 9:
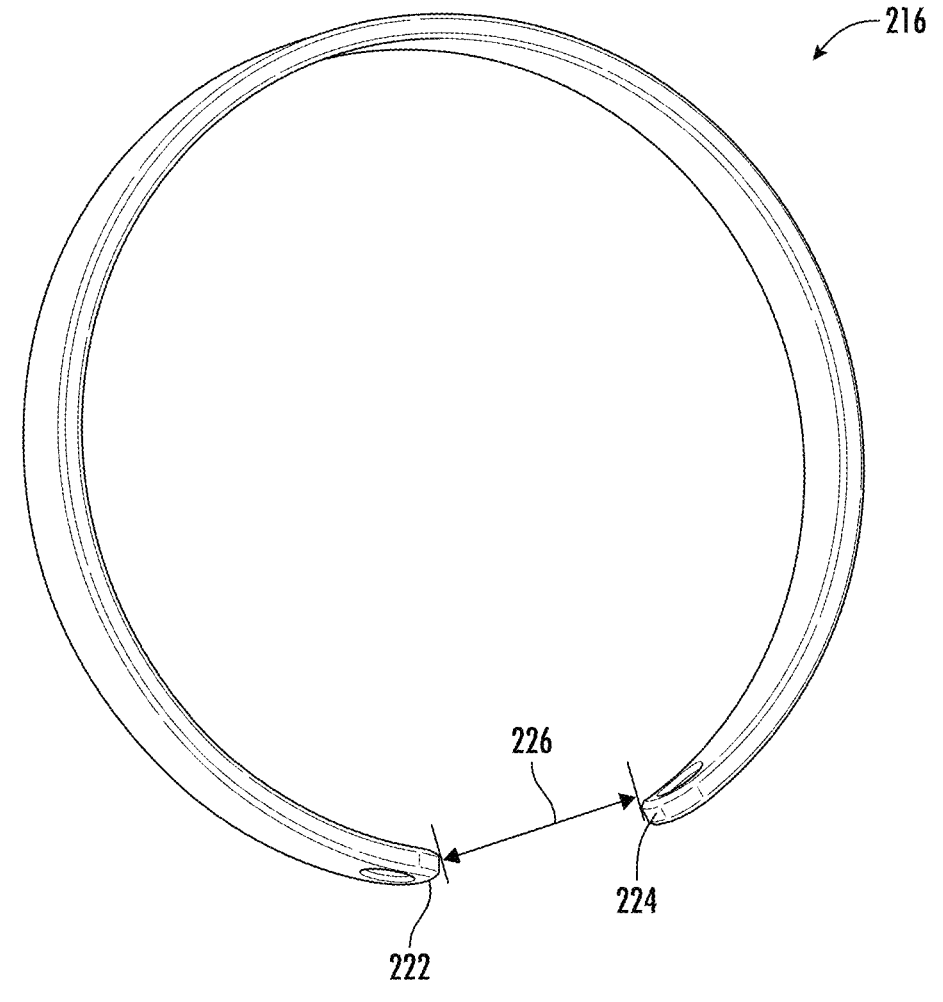
FIG. 9 illustrates a perspective view of an embodiment of a bearing support of the bearing assembly according to the present disclosure.

Referring now to FIGS. 6-9, various views of an embodiment of a bearing assembly 200 according to the present disclosure are illustrated. FIG. 6 illustrates a cross-sectional view of a portion of the closed-cycle engine 102, 104 illustrated in FIG. 4 along section line 6-6 according to the present disclosure. FIG. 7 illustrates a detailed view of a portion of the cross-sectional view of FIG. 6. FIG. 8 illustrates a detailed view of a portion of the cross-sectional view of FIG. 7. FIG. 9 illustrates a perspective view of an embodiment of a bearing support of the bearing assembly 200 according to the present disclosure.

Referring particularly to FIG. 6, the closed-cycle engine 102, 104 includes a shaft 202 for driving one of the piston assemblies 118 (not shown in FIG. 6) described herein. Moreover, as shown, the closed-cycle engine 102, 104 includes the stator assembly 136 supporting the shaft 202 and housing the load device 112. Thus, as shown, the bearing assembly 200 is configured to support an end of the shaft 202. More specifically, as shown in FIG. 6, a first bearing assembly 204 may support a forward end 208 of the shaft 202 and a second bearing assembly 206 may support an aft end 210 of the shaft 202.

Moreover, in an embodiment, as shown in FIGS. 6-9, the bearing assembly 200 may include a bearing housing 212, a fluid bearing 214 within the bearing housing 212, and a bearing support 216 defining a support surface 218 (FIG. 7) engaged with the fluid bearing 214. Thus, in an embodiment, the fluid bearing 214 described herein may be a forward bearing, an aft bearing, or both of the closed-cycle engine 102, 104.

Referring particularly to FIG. 6, the bearing housing 212 includes an opening 220 for receiving the shaft 202 therethrough. Further, as shown in FIGS. 7 and 8, the support surface 218 of the bearing support 216 defines a curved or arcuate profile to allow the fluid bearing 214 to maintain alignment with the shaft 202 as the shaft 202 tilts during operation of the closed-cycle engine 102, 104.

In particular embodiments, as an example, mechanical misalignment between the magnet array 205 on the shaft 202, the stator assembly 136, and/or stator ends may cause an eccentric side load on the shaft 202. In an embodiment, mechanical misalignment between these components can result from manufacturing tolerances. In addition to the eccentric side load, random vibration during operation of the closed-cycle engine can induce additional loads on the shaft 202. These loads can cause the shaft 202 to deflect in the closed-cycle engine, with the largest deflection between the first and second bearing assemblies 204, 206. As a result, the shaft 202 can tilt relative to the bearing assemblies 200. Thus, the arcuate profile of the support surface 218 of the bearing support 216 is configured to address such issues by allowing the fluid bearing 214 to tilt with the shaft 202.

Further, as shown in FIGS. 7 and 8, the bearing assembly 200 may also include a bearing sleeve 228 arranged radially exterior of the fluid bearing 214. Thus, in an embodiment, as shown in FIGS. 7 and 8, the arcuate profile may be engaged with an exterior surface 231 of the bearing sleeve 228. Moreover, as shown particularly in FIGS. 7 and 8, the bearing support 216 is positioned at least partially within a recess 230 of the bearing housing 212 with the arcuate profile contacting the bearing sleeve 228.

Furthermore, in an embodiment, the bearing assembly 200 may also include at least one O-ring positioned within another recess of the bearing housing 212 and/or aligned in an axial direction with the bearing support 216. For example, as shown in FIGS. 7 and 8, the bearing assembly 200 includes a first O-ring 232 and a second O-ring 234 positioned within first and second recesses 236, 238, respectively, arranged on opposite sides of the bearing support 216. In addition, the bearing assembly 200 may also include one or more O-rings 235 on the axial face of the fluid bearing 214.

Referring particularly to FIG. 9, the bearing support 216 has an annular shape. Moreover, in an embodiment, as shown, the bearing support 216 extends from a first end 222 to a second end 224. Further, as shown, the first and second ends 222, 224 are spaced apart from each other and define a gap 226 therebetween. Thus, in such embodiments, the first and second ends 222, 224 of the bearing support 216 being spaced apart to assist with installing of the bearing support 216 into the recess 230.

Figure 10:
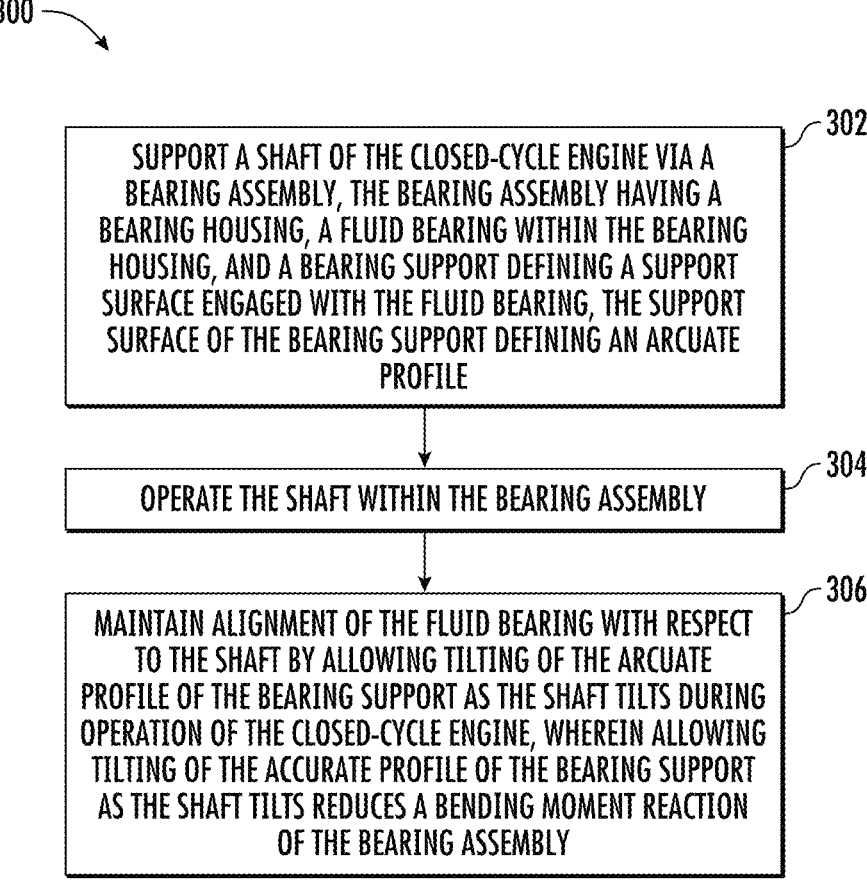
FIG. 10 illustrates a flow diagram of an embodiment of a method for operating a closed-cycle engine of a vehicle according to the present disclosure.

Referring now to FIG. 10, a flow diagram of an embodiment of a method 300 of operating a closed-cycle engine having a cold side and a hot side of a vehicle is illustrated. In general, the method 300 will be described herein with reference to the closed-cycle engine 102, 104 illustrated in FIGS. 1-9. However, it should be appreciated that the disclosed method 300 may be implemented with any engine having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in numerous ways without deviating from the scope of the present disclosure.

Thus, as shown at (302), the method 300 includes supporting a shaft of the closed-cycle engine via a bearing assembly, the bearing assembly having a bearing housing, a fluid bearing within the bearing housing, and a bearing support defining a support surface engaged with the fluid bearing, the support surface of the bearing support defining an arcuate profile. As shown at (304), the method 300 includes operating the shaft within the bearing assembly. As shown at (306), the method 300 includes maintaining alignment of the fluid bearing with respect to the shaft by allowing tilting of the arcuate profile of the bearing support as the shaft tilts during operation of the closed-cycle engine, wherein allowing tilting of the arcuate profile of the bearing support as the shaft tilts reduces a bending moment reaction of the bearing assembly.

Further aspects are provided by the subject matter of the following clauses:

A linear electric machine, comprising: a shaft; a piston assembly operably coupled with the shaft; a stator assembly supporting the shaft and housing a load device; and a bearing assembly supporting an end of the shaft, the bearing assembly comprising a bearing housing, a fluid bearing within the bearing housing, and a bearing support defining a support surface engaged with the fluid bearing, the bearing housing comprising an opening for receiving the shaft therethrough, wherein the support surface of the bearing support defines an arcuate profile to allow the fluid bearing to maintain alignment with the shaft as the shaft tilts during operation of the linear electric machine.

The linear electric machine of any preceding clause, wherein the bearing support has an annular shape.

The linear electric machine of any preceding clause, wherein the bearing support extends from a first end to a second end, the first and second ends being spaced apart from each other and defining a gap therebetween.

The linear electric machine of any preceding clause, wherein the bearing assembly further comprises a bearing sleeve arranged radially exterior of the fluid bearing, the arcuate profile engaged with an exterior surface of the bearing sleeve.

The linear electric machine of any preceding clause, wherein the bearing support is positioned at least partially within a recess of the bearing housing with the arcuate profile contacting the bearing sleeve.

The linear electric machine of any preceding clause, further comprising at least one O-ring positioned within another recess of the bearing housing and being aligned in an axial direction with the bearing support.

The linear electric machine of any preceding clause, wherein the at least one O-ring comprises a first O-ring and a second O-ring positioned within first and second recesses, respectively, arranged on opposite sides of the bearing support.

The linear electric machine of any preceding clause, wherein the fluid bearing is one of a forward bearing or an aft bearing of the linear electric machine.

The linear electric machine of any preceding clause, wherein the linear electric machine is a closed-cycle engine.

A bearing assembly, comprising: a bearing housing; a fluid bearing positioned within the bearing housing; and a bearing support defining a support surface engaged with the fluid bearing, the bearing housing comprising an opening for receiving a shaft therethrough, wherein the support surface of the bearing support defines an arcuate profile to allow the fluid bearing to maintain alignment with the shaft as the shaft tilts during operation.

The bearing assembly of any preceding clause, wherein the bearing support has an annular shape.

The bearing assembly of any preceding clause, wherein the bearing support extends from a first end to a second end, the first and second ends being spaced apart from each other and defining a gap therebetween.

The bearing assembly of any preceding clause, wherein the bearing assembly further comprises a bearing sleeve arranged radially exterior of the fluid bearing, the arcuate profile engaged with an exterior surface of the bearing sleeve.

The bearing assembly of any preceding clause, wherein the bearing support is positioned at least partially within a recess of the bearing housing with the arcuate profile contacting the bearing sleeve.

The bearing assembly of any preceding clause, further comprising at least one O-ring positioned within another recess of the bearing housing and being aligned in an axial direction with the bearing support.

The bearing assembly of any preceding clause, wherein the at least one O-ring comprises a first O-ring and a second O-ring positioned within first and second recesses, respectively, arranged on opposite sides of the bearing support.

The bearing assembly of any preceding clause, wherein the fluid bearing is one of a forward bearing or an aft bearing of a closed-cycle engine.

The bearing assembly of any preceding clause, wherein the closed-cycle engine is a linear electric machine.

A method of operating a closed-cycle engine having a cold side and a hot side of a vehicle, the method comprising: supporting a shaft of the closed-cycle engine via a bearing assembly, the bearing assembly having a bearing housing, a fluid bearing within the bearing housing, and a bearing support defining a support surface engaged with the fluid bearing, the support surface of the bearing support defining an arcuate profile; operating the shaft within the bearing assembly; and maintaining alignment of the fluid bearing with respect to the shaft by allowing tilting of the arcuate profile of the bearing support as the shaft tilts during operation of the closed-cycle engine, wherein allowing tilting of the arcuate profile of the bearing support as the shaft tilts reduces a bending moment reaction of the bearing assembly.

The method of any preceding clause, wherein the bearing support has an annular shape extending from a first end to a second end, the first and second ends being spaced apart from each other and defining a gap therebetween, the method further comprising installing the bearing support in a recess of the bearing housing with the arcuate profile of the bearing support engaged with an exterior surface of the bearing assembly, wherein the first and second ends of the bearing support are spaced apart to assist with the installing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A linear electric machine, comprising:

a shaft;

a piston assembly operably coupled with the shaft;

a stator assembly supporting the shaft and housing a load device; and a bearing assembly supporting an end of the shaft, the bearing assembly comprising a bearing housing, a fluid bearing within the bearing housing, and a bearing support defining a support surface engaged with the fluid bearing, the bearing housing comprising an opening for receiving the shaft therethrough, wherein the support surface of the bearing support defines an arcuate profile to allow the fluid bearing to maintain alignment with the shaft as the shaft tilts during operation of the linear electric machine.

2. The linear electric machine of claim 1, wherein the bearing support has an annular shape.

3. The linear electric machine of claim 1, wherein the bearing support extends from a first end to a second end, the first and second ends being spaced apart from each other and defining a gap therebetween.

4. The linear electric machine of claim 1, wherein the bearing assembly further comprises a bearing sleeve arranged radially exterior of the fluid bearing, the arcuate profile engaged with an exterior surface of the bearing sleeve.

5. The linear electric machine of claim 4, wherein the bearing support is positioned at least partially within a recess of the bearing housing with the arcuate profile contacting the bearing sleeve.

6. The linear electric machine of claim 5, further comprising at least one O-ring positioned within another recess of the bearing housing and being aligned in an axial direction with the bearing support.

7. The linear electric machine of claim 6, wherein the at least one O-ring comprises a first O-ring and a second O-ring positioned within first and second recesses, respectively, arranged on opposite sides of the bearing support.

8. The linear electric machine of claim 1, wherein the fluid bearing is one of a forward bearing or an aft bearing of the linear electric machine.

9. The linear electric machine of claim 1, wherein the linear electric machine is a closed-cycle engine.

10. A bearing assembly, comprising:

a bearing housing;

a fluid bearing positioned within the bearing housing; and a bearing support defining a support surface engaged with the fluid bearing, the bearing housing comprising an opening for receiving a shaft therethrough, wherein the support surface of the bearing support defines an arcuate profile to allow the fluid bearing to maintain alignment with the shaft as the shaft tilts during operation, wherein the bearing assembly further comprises a bearing sleeve arranged radially exterior of the fluid bearing, the arcuate profile engaged with an exterior surface of the bearing sleeve.

11. The bearing assembly of claim 10, wherein the bearing support has an annular shape.

12. The bearing assembly of claim 10, wherein the bearing support extends from a first end to a second end, the first and second ends being spaced apart from each other and defining a gap therebetween.

13. The bearing assembly of claim 10, wherein the bearing support is positioned at least partially within a recess of the bearing housing with the arcuate profile contacting the bearing sleeve.

14. The bearing assembly of claim 13, further comprising at least one O-ring positioned within another recess of the bearing housing and being aligned in an axial direction with the bearing support.

15. The bearing assembly of claim 14, wherein the at least one O-ring comprises a first O-ring and a second O-ring positioned within first and second recesses, respectively, arranged on opposite sides of the bearing support.

16. A method of operating a closed-cycle engine having a cold side and a hot side of a vehicle, the method comprising:

supporting a shaft of the closed-cycle engine via a bearing assembly, the bearing assembly having a bearing housing, a fluid bearing within the bearing housing, and a bearing support defining a support surface engaged with the fluid bearing, the support surface of the bearing support defining an arcuate profile;

operating the shaft within the bearing assembly; and maintaining alignment of the fluid bearing with respect to the shaft by allowing tilting via the arcuate profile of the bearing support as the shaft tilts during operation of the closed-cycle engine, wherein allowing tilting via the arcuate profile of the bearing support as the shaft tilts reduces a bending moment reaction of the bearing assembly.

17. The method of claim 16, wherein the bearing support has an annular shape extending from a first end to a second end, the first and second ends being spaced apart from each other and defining a gap therebetween, the method further comprising installing the bearing support in a recess of the bearing housing with the arcuate profile of the bearing support engaged with an exterior surface of the bearing assembly, wherein the first and second ends of the bearing support are spaced apart to assist with the installing.

* * * * *